Aug. 2, 1966  K. E. GOLDEN  3,263,558
FOCUSING MEANS FOR A SLIDE PROJECTOR
Original Filed May 22, 1961  7 Sheets-Sheet 1

INVENTOR.
Kenneth E. Golden,
BY
Greist, Lockwood, Greenawalt & Dewey
attys.

United States Patent Office 3,263,558
Patented August 2, 1966

3,263,558
FOCUSING MEANS FOR A SLIDE PROJECTOR
Kenneth E. Golden, Portland, Oreg., assignor to Sawyers, Inc., Portland, Oreg., a corporation of Oregon
Original application May 22, 1961, Ser. No. 111,783, now Patent No. 3,130,637, dated Apr. 28, 1964. Divided and this application Aug. 6, 1963, Ser. No. 303,981
5 Claims. (Cl. 88—24)

This application is a division of Serial No. 111,783, filed May 22, 1961, now Patent No. 3,130,637.

The present invention relates generally to a slide projector having a slide changing mechanism for transferring slides between a slide tray and a viewing position within the projector, a mechanism actuated by the slide changing mechanism for automatically indexing the slide tray either forwardly or rearwardly, and an adjustable focusing mechanism. The present invention relates more particularly to a fully automatic slide projector of the character described having an adjustable timer for controlling the viewing period of the slides and a hand control for remotely controlling the operation of the various mechanisms.

A general object of the present invention is to provide a new and improved fully automatic slide projector of the character described which may be controlled remotely and which is provided with an adjustable slide viewing timer.

It is an important object of the present invention to provide a new and improved fully automatic projector of the character described wherein the slide changing and slide tray indexing mechanisms are actuated by a low voltage A.C. motor, wherein the mechanism for reversing the direction in which the slide tray is indexed is actuated by a solenoid, and wherein the focusing mechanism is actuated by a reversible D.C. motor.

It is another important object of the present invention to provide a new and improved fully automatic projector of the character described having an adjustable motor driven timer for actuating the slide changing cycle motor at periodic intervals whereby to project slides on a screen for uniform predetermined time periods.

Another important object of the present invention is to provide a new and improved fully automatic projector of the character described wherein the switches for controlling operation of the various motor and the index-reversing solenoid are mounted in a compact handpiece connected to the projector by an extended length of conductor cord whereby the projector may be fully controlled remotely.

A further object of the present invention is to provide a new and improved fully automatic projector of the character described wherein the focusing mechanism includes a friction clutch arrangement whereby the focusing may be adjusted either manually or by remote controlled operation of the reversible D.C. motor.

A more detailed object of the present invention is to provide a new and improved fully automatic projector of the character described wherein the reciprocable slide carrier of the slide changing mechanism is operably connected to the cycle motor through a planetary gear system during automatic operation of the projector with the slide carrier being connected to a drive pin of the gear system by a hook member during inward movement of the slide carrier when a slide is transferred from a slide tray to a viewing position within the projector and with the hook member being disengaged from the drive pin during return movement of the slide carrier when the slide is returned to its storage position in the slide tray.

A further object of the present invention is to provide a new and improved over-center linkage mechanism, which mechanism is operably connected between a two-position plate member of the slide tray indexing mechanism and the index-reversing solenoid whereby the plate member is shifted between its forward and rearward slide tray indexing positions each time the solenoid is energized.

Certain other objects of the invention will, in part, be obvious, and will in part appear hereinafter.

For a more complete understanding of the nature and scope of the invention reference may now be had to the accompanying drawings wherein.

Figure 1:
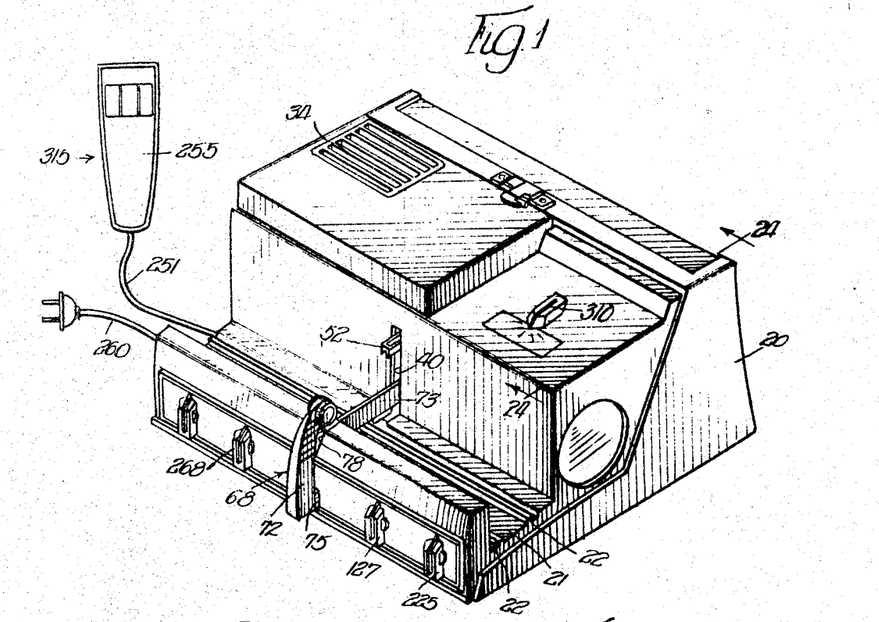
FIG. 1 is a perspective view of a remote control fully automatic slide projector embodying the invention.
Figure 3:
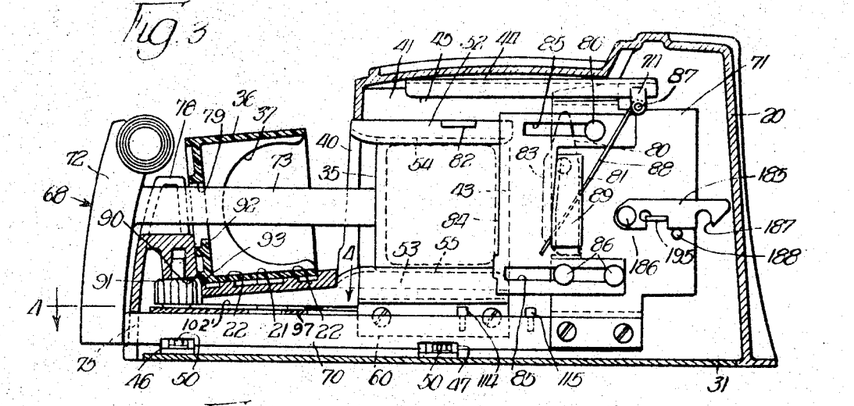
FIG. 3 is a vertical section taken generally on the line 3—3 of FIG. 2 with the upper portion of the casing in place and a slide tray positioned in the slide tray receiving groove.

As best shown in FIGS. 1 and 3, a preferred embodiment of the invention includes an upper projector housing or casing 20 which is preferably formed of metal and in one piece, as by a casting operation. The upper casing 20 is provided with a slide-tray-receiving channel or trough-like groove 21 which extends along one side thereof and is open at its top and at the forward and rearward ends of the casing 20. Suitable slide rails 22 are provided on the bottom surface of the groove 21.

Figure 2:
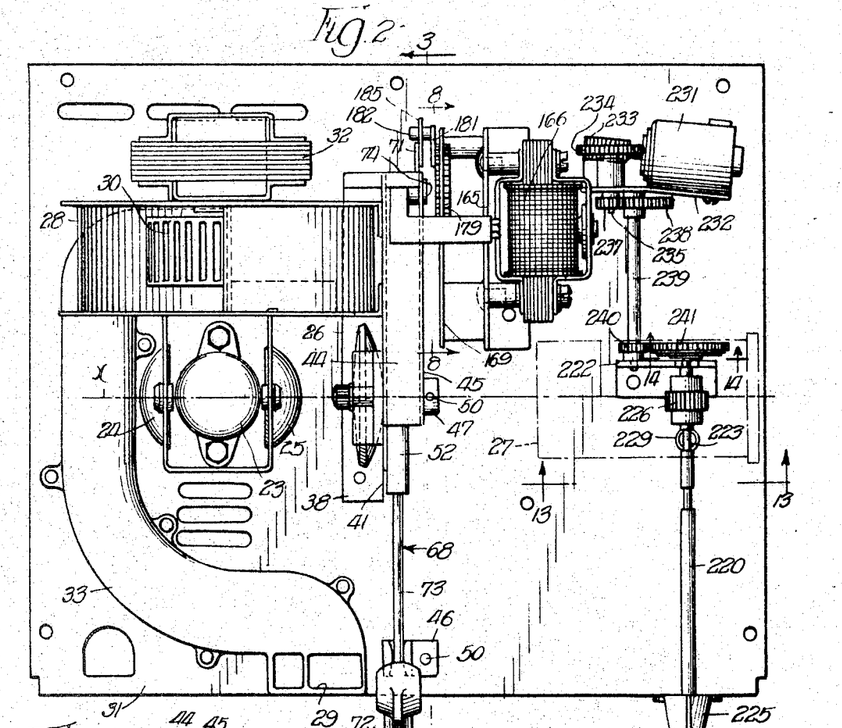
FIG. 2 is an enlarged top plan view of the interior of the projector with the upper portion of the casing removed and with the adjustable lens housing shown in broken line.

The optical axis of the projector is indicated by broken line x—x in FIG. 2 and, as is well known in the art, a lamp 23, a reflector 24, lenses 25 and 26, and an adjustable focusing-lens-housing 27 are disposed in the projector casing 20 in alignment with the optical axis x—x thereof. Suitable supporting structure for the lamp, reflector, and lenses is provided but is not described herein as it comprises no part of the invention.

The bottom surface of the slide-tray-receiving groove 21 is spaced a substantial distance above the bottom edge of the casing 20 for reasons which will be fully explained hereinafter. In the embodiment of the invention shown in the drawings, this distance is equal to approximately one-fourth the total height of the projector casing 20. The open bottom of the upper casing 20 is closed by a suitable base plate member 31 as is best illustrated in FIGS. 2 and 3.

A blower in the form of a fan wheel 30 operably connected to a blower motor 32 is provided for inducing a flow of air past the bulb 23 whereby to substantially reduce the temperature within the projector casing 20 and thus prevent damage to the slides or transparencies being shown therein. The fan wheel 30 is disposed within a sub-housing 28 and an air duct 33 secured against the base plate 31 by suitable fastening members has one end in communication with the lower portion of the sub-housing 28 and the other end 29 adapted to communicate with a vertically extending duct (not shown) which is disposed in the portion of the upper casing 20 defining the outer wall of the slide-tray-receiving groove 21, which vertically disposed duct opens inwardly of the groove 21 at its upper end. Air vents 34 (FIG. 1) are provided in the top wall of the upper casing 20.

Slides and transparencies of the type intended to be shown on a screen by means of the projector disclosed herein are usually mounted in 2" x 2" paperboard mounting members. One such typical slide is shown in FIG. 3 and is identified by a reference numeral 35. Such slides are often stored for convenience in slide trays such as a slide tray 36 shown in FIG. 3. The slide tray 36, which is of a well known conventional type, may be formed of plastic or other suitable material and is provided with a series of spaced apart partitions or septums 37 which extend partially therethrough. The slide tray 36 is adapted to store thirty or more slides which may be placed in the tray or removed therefrom through an open side thereof. The slide storage spaces between adjacent partitions or septums 37 may be consecutively numbered whereby a person showing the slides may be able to identify each slide immediately through a correspondingly numbered descriptive index. The slide tray 36 is adapted to be set down into the slide-tray-receiving groove 21 with the open side thereof disposed toward the optical axis x—x of the projector.

In order to permit transfer of slides from the slide tray 36 to a viewing position within the projector casing 20 in centered alignment with the optical axis x—x, a vertically extending slide aperture 40 is formed in a portion of the casing defining the inner wall of the groove 21 approximately midway between the front and rear ends of the upper casing 20. A slide changing mechanism, which will be described hereinafter, is provided for transferring slides between the slide tray 36 positioned in the groove 21 and a viewing position within the projector.

Figure 6:
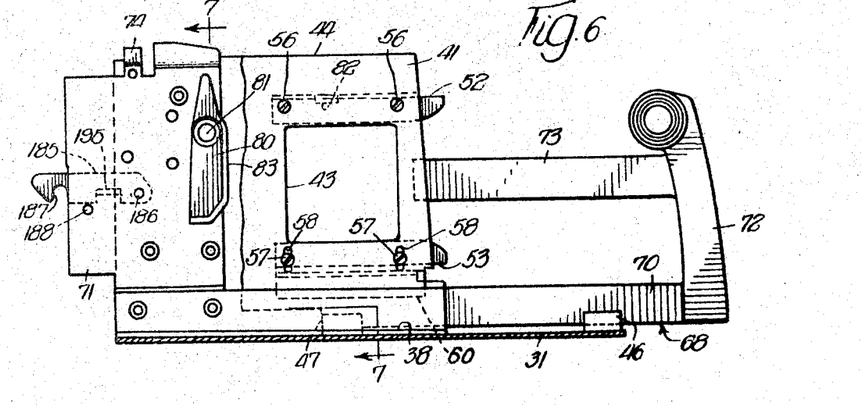
FIG. 6 is an elevational view of the slide carrier and the portion of the projector upon which it is slidably supported looking from the rear when the slide carrier is in its innermost position, the supporting structure being partially broken away to better show the slide eject flipper member.

A generally vertically extending plate member 41 is rigidly supported within and transversely of the casing 20 in alignment with the rear edge of the slide aperture 40. The lower edge of the plate member 41 is provided with a horizontal rearwardly extending flange 38 which is secured to the upper surface of the base plate member 31 by suitable fasteners, for example, rivets. This vertical plate member structure is most clearly shown in FIGS. 6 and 7. The plate member 41 is provided with a generally square slide viewing aperture 43 approximately the same size as the mounted slide 35, the aperture 43 being aligned with the optical axis x—x of the projector. A top portion 44 at the upper edge of the plate member 41 is bent forwardly and then downwardly to define a guide rail 45. A pair of guide blocks 46 and 47 formed of nylon, plastic or other suitable bearing material are secured to the base plate member 31 immediately forward of the lower edge of the plate member 41 in spaced apart relationship by suitable fasteners 50.

An upper track member 52 and a lower track member 53 are mounted on the front surface of the plate member 41 adjacent the upper and lower edges respectively of the aperture 43 formed therein. The track members 52 and 53 are adapted to support a mounted slide 35, when positioned adjacent the slide viewing aperture 43, in alignment with the optical axis x—x of the projector. For this reason, the track member 52 is provided with a downwardly opening V-shaped groove 54 and the track member 53 is provided with an upwardly opening V-shaped groove 55. The ends of the track members 52 and 53 adjacent the slide-tray-receiving groove 21 project slightly through the vertical aperture 40 at the upper and lower ends thereof, respectively, with the upper V-shaped groove 54 diverging slightly upwardly and the lower V-shaped groove 55 diverging slightly downwardly so as to facilitate slidably positioning the mounted slide 35 in alignment with the viewing aperture 43.

Figure 7:
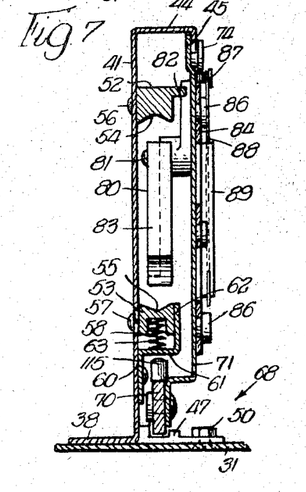
FIG. 7 is a vertical section taken generally on the line 7—7 of FIG. 6.

As is best shown in FIG. 7, the upper track member 52 is rigidly secured to the plate member 41 by fastening members, such as rivets or threaded members 56. The lower track member 53, however, is mounted for resilient movement in a vertical direction relative to the plate member 41 whereby slightly over-sized mounted slides may be readily accommodated in the projector. The track member 53 is connected to the plate member 41 by means of fastener members, such as rivets or threaded members 57, which are movable within vertical slots 58 formed in the plate member 41. A guide member is provided which has a lower portion 60 secured to the plate member 41 by suitable fasteners, a forwardly extending portion 61 disposed below the track member 53, and a portion 62 extending upwardly alongside the forward surface of the track member 53. A pair of compression springs 63 which are seated between the forwardly extending portion 61 of the guide member and suitable recesses formed in the lower surface of the track member 53 are provided to normally urge the track member 53 towards its uppermost position.

A slide carrier, indicated generally by the reference numeral 68, is reciprocable transversely of the projector casing 20 and is adapted for transferring slides between the slide tray 36 positioned in the groove 21 and a position in centered alignment with the viewing aperture 43. The slide carrier 68 has three main portions, which may be integrally formed, including an elongated bar member 70 which is slidably supported in the guide blocks 46 and 47, a handle member 72 which extends upwardly from the outer end of the bar member 70, and a pusher arm 73 which extends inwardly from the upper end of the handle member 72 toward the optical axis x—x of the projector in parallel spaced arrangement above the bar member 70. An upwardly extending plate member 71 is secured by suitable fastening means to the inner end of the bar member 70. The upper edge of the plate member 71 is preferably provided with a forwardly and upwardly turned lug 74 which is adapted to extend over the front surface of the rail portion 45 of the stationary plate member 41. The slide carrier 68, therefore, is slidably mounted for reciprocable movement in a horizontal direction transversely of the projector by means of the guide blocks 46 and 47 and the lug 74.

The elongated bar member 70 is disposed wholly below the bottom surface of the slide-tray-receiving groove 21 and is slidable through a vertical slot 75 formed in the portion of the projector casing 20 defining the outer wall of the slide-tray-receiving groove 21. The pusher arm 73 is adapted to slidably extend through a vertical slot or groove 78 formed in the upper edge portion of the casing 20 defining the outer wall of the slide-tray-receiving groove 21 and between adjacent pair of the partitions or septums 37 in the slide tray 36, necessary openings 79 (FIG. 3) being provided in the side of the slide tray 36 opposite the open side thereof to permit movement of the pusher arm 73 therethrough into engagement with a mounted slide 35.

When the slide carrier 68 is in its outermost position, the pusher arm 73 is disposed wholly outside of the slide-tray-receiving groove 21. With this arrangement, when the pusher arm 73 is in its outermost position, it is a simple matter either to lift the slide tray 36 upwardly out of the groove 21 or to set the slide tray 36 down into the groove 21 with the slide tray 36 positioned with any particular one of the slides aligned with the vertical slide aperture 40 in the projector casing 20. The desired slide is thus positioned for immediate positioning in the projector and thus for immediate viewing. This convenient means for loading and unloading the slide tray 36 into and from the slide-tray-receiving groove 21 is possible because the groove 21 is provided with an open top and because the slide carrier 68 may be positioned so that no part thereof extends through or above the groove 21. This means of loading trays is much more convenient than having to insert them through either the forward or rearward ends of a tunnel-like slide-tray-receiving groove as is necessary with projectors wherein either portions of the projector casing extend across the top of the slide-tray-receiving groove or portions of the slide changing mechanism extend above the groove.

When the slide carrier 68 is moved inwardly from its outermost position, the innermost end of the pusher arm 73 is adapted to engage a slide 35 stored in the slide tray 36 so as to transfer the slide 35 from the slide tray 36 through the vertical aperture 40 to a position in which the slide 35 is in register or centered alignment with the slide viewing aperture 43 formed in the plate 41. In this position, the slide 35 is supported between the V-shaped grooves 54 and 55 of the upper and lower track members 52 and 53, respectively, and in alignment with the optical axis x—x of the projector. The slide 35 is transferred from the slide tray 36 to its viewing position at the same rate of movement as that of the inward movement of the slide carrier 68.

The slide 35 which is positioned for viewing adjacent the viewing aperture 43 is returned to its storage position in the slide tray 36 upon outward movement of the slide carrier 68 from its innermost position by means of a mechanism which will now be described. A kicker or flipper arm 80 (FIGS. 3, 6 and 7) is pivotally mounted intermediate the ends thereof on the rear surface of the upstanding plate 71 which is secured to the inner end of the elongated bar member 70 by means of a conventional combination bearing-and-fastener element 81. A projecting member or ear 82 projects forwardly from the upper track member 52 and is adapted to be engaged by the upper end of the flipper member 80, which member normally hangs in a vertical position due to the fact that the lower portion thereof has a greater mass than the upper end portion. The edge of the lower portion of the flipper member 80 which is disposed nearest to the optical axis x—x of the projector is formed with a broadened cam surface 83 for engagement with the edge of the mounted slide 35.

With the device described herein, the slide 35 is adapted to be fully returned to its storage position in the slide tray 36 before the slide carrier 68 reaches the limit of its outward stroke. The innermost position of the slide carrier 68 is shown in FIG. 3. During the first portion of the outward movement of the slide carrier 68, the slide carrier moves from the position shown in FIG. 3 to a position wherein the cam surface 83 on the flipper member 80 first engages the edge of the mounted slide 35. During this portion of the outward movement of the slide carrier 68, the mounted slide 35 remains stationary while the innermost end of the pusher arm 73 is moved away from the mounted slide 35.

During the next or second portion of the outward movement of the slide carrier 68, the mounted slide 35 is moved toward the slide tray 36, through its engagement with the flipper member 80, at substantially the same rate of movement as that of the slide carrier 68. The innermost end of the pusher arm 73 remains substantially the same distance from the mounted slide 35 that it moved during the first portion of the outward movement of the slide carrier 68 when the slide 35 remained stationary. This second portion of the outward movement of the slide carrier 68 is relatively small and is terminated simultaneously as the upper end of the flipper arm 80 first engages the forwardly projecting ear 82 which is rigidly secured on the upper track member 52.

During the next or third portion of the outward movement of the slide carrier 68, the upper end of the flipper member 80 is engaged by the projecting ear 82 whereby the lower portion of the flipper member 80 is pivoted relatively rapidly toward the left clockwise, as viewed in FIG. 3. This pivoting movement of the flipper arm 80 fully returns the mounted slide 35 to its storage position within the slide tray 36 and at a rate of movement which is substantially greater than the corresponding movement of the slide carrier 68. This rapid return or eject movement of the slide may be described as the vectorial sum of the corresponding outward movement of the slide carrier 68 and the linear movement imparted to the slide by the pivoting movement of the flipper member 80. The parts are arranged such that the innermost end of the pusher arm 73 has cleared the inner surface of the outer wall of the slide tray 36 by the time the slide 35 abuts thereagainst. Simultaneously as the slide 35 is fully returned to its position in the slide tray 36, the upper end of the flipper member 80 passes under, and is disengaged from, the projecting ear 82 whereby the flipper member 80 is permitted to swing back into its normal vertically disposed position, in which position it is not only disengaged from the slide 35 but it is also spaced a considerable distance therefrom.

The next or final portion of the outward movement of the slide carrier 68 is utilized for indexing the slide tray 36 as will be fully explained hereinafter. This additional outward movement of the slide carrier 68 is permitted because the flipper member 80 has already been disengaged from the fully returned slide 35. This disengagement of the flipper member 80 from the fully returned slide 35 also permits unobstructed indexing of the slide tray 36 during this final portion of the outward movement of the slide carrier 68.

Figure 5:
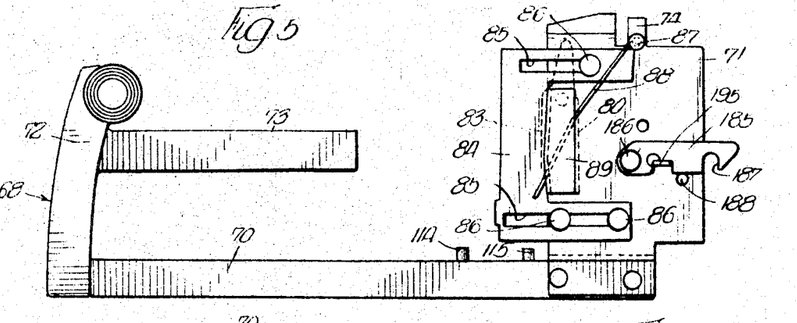
FIG. 5 is a front elevational view of the slide carrier of the slide changing mechanism and the shutter slidably mounted thereon.

A shutter member 84 is preferably associated with the slide changer 68 for preventing the passage of light through the lens housing 27 during the transfer of slides 35 between the slide tray 36 and the viewing aperture 43. As best illustrated in FIG. 5, the shutter member 84 is mounted on the front surface of the upstanding plate 71, which is secured to the inner end of the elongated bar member 70, for slidable movement in a horizontal direction. The shutter member 84 is provided adjacent its upper and lower edges with a pair of vertically spaced horizontally extending slots 85. The lower slot 85 is slidably mounted on the plate member 71 by means of a pair of horizontally spaced enlarged headed bearing pins 86 which may be formed of nylon, plastic or the like with the upper slot 85 being slidably mounted on the plate member 71 by a single identical bearing pin 86. Provision is made for resiliently retaining the shutter member 84 in its limit position most closely adjacent to the pusher arm 73, as in FIG. 5. A coil spring disposed about a pin 87 secured to the plate 71 immediately below the lug 74 has an extended end portion 88 which abuts against a forwardly and outwardly bent shoulder portion 89 of the shutter member 84 whereby to resiliently retain the shutter member 84 in its outermost or extended position with its outer edge spaced away from the corresponding edge of the plate member 71.

The inner edge portion of the shutter member 84 is cut away centrally for a purpose which will be self-evident hereinafter whereby the shutter member 84 is generally C-shaped. When the slide carrier 68 is in its innermost position, as illustrated in FIG. 3, the outer edge of the shutter member 84 is disposed substantially in alignment with the edge of the transparent portion of a slide 35 furthest from the pusher arm 73. As the slide carrier 68 is moved outwardly to return the slide to the slide tray 36, the shutter member 84 carried on the plate member 71 moves with the slide carrier 68 across the aperture 43 whereby to block the passage of light through the lens housing 27 during the period that no slide is positioned in register with the aperture 43 for projection on a screen. The outer edge of the shutter member 84 is engageable with the inner surface of the portion of the projector casing 20 immediately forward of the vertical slide aperture 40 before the slide carrier 68 reaches its outermost position. The resilient mounting of the shutter member 84 permits additional outward movement of the slide carrier 68 after the outer edge of the shutter member 84 engages the inner surface of the projector 20, the plate member 71 then moving outwardly relative to the stopped shutter member 84 whereby the shutter member 84 continues to block the aperture 43. Inward movement of the slide carrier 68 again permits the shutter member 84 to assume the position illustrated in FIG. 3, in which position the viewing aperture 43 is not blocked.

The movement of the shutter member 84 is not dependent in any way upon whether or not a slide is being transferred between the slide tray 36 and the viewing aperture 43. Rather, the operation of the shutter member 84 is dependent solely upon the movement of the slide carrier 68. Thus, inward movement of the slide carrier 68 without the pusher arm 73 advancing a slide into the projector, as at the end of a slide viewing session, will result in an unblocked viewing aperture 43 whereby to permit the escape of light through the lens housing 27 and provide sufficient light in the darkened room to permit a person to find the switch for the room lighting.

As before mentioned herein, the projector is provided with a slide-tray-indexing mechanism which is adapted to be actuated during the final portion of the outward movement of the slide carrier 68. An arcuate slot or opening 90 (FIG. 3) is provided in the base of the slide-tray-receiving groove 21 adjacent the outer wall thereof and in lateral alignment with the vertical slide aperture 40 which is formed in the inner wall of the groove 21. An indexing gear 91 is rotatably mounted on a bearing shaft 92 which is suitably supported in a portion of the projector casing 20. The gear 91 is positioned so that a portion of the teeth thereof extend through the opening 90 and into the slide-tray-receiving groove 21. A rack, indicated at 93 in FIG. 3, is formed along the bottom edge of the outer side of the slide tray 36 shown in the drawing and is adapted to be engaged by the teeth of the indexing gear 91 whereby rotation of the gear 91 moves or indexes the slide tray 36 forwardly or rearwardly of the slide-tray-receiving groove 21 depending upon in which direction the gear 91 is rotated. As some slide trays may have a rack formed on the bottom side thereof, the teeth of the gear 91 are preferably formed with a special design adapted to permit engagement thereof with either a rack formed on the vertical side of a slide tray, as in the drawings, or a rack formed on the horizontal bottom side of a slide tray.

Figure 4:
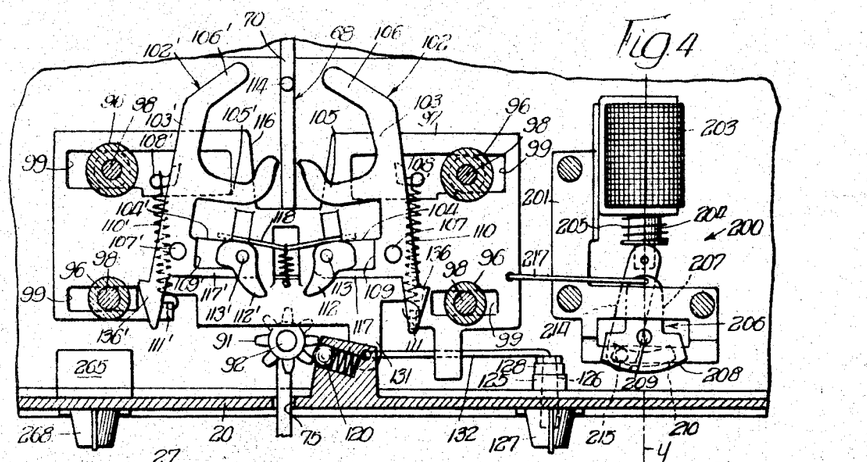
FIG. 4 is an enlarged generally horizontal section taken generally on the line 4—4 of FIG. 3 with the plate member of the slide tray indexing mechanism and the over-center linkage system shown in neutral positions.

The mechanism for rotating the indexing gear 91 upon each outward movement of the slide carrier 68 whereby to index the slide tray 36 one position each time a slide 35 is returned to the slide tray 36 will now be described. The projector casing 20 is provided on the underside of the portion defining the bottom wall of the slide-tray-receiving groove 21 with downwardly extending bosses 96, as shown in FIG. 4. A plate member 97 is supported at the lower ends of the bosses 96 by suitable fastener members 98 which extend through elongated slots 99 formed in the plate member 97 whereby the plate member 97 is shiftable forwardly and rearwardly of the projector for purposes and by a mechanism to be fully described herein. When the plate member 97 is positioned midway between its two limit positions, as in FIG. 4, the center of the plate member 97 is aligned with the vertical axis of the indexing gear 91.

A pair of identical, generally E-shaped, three-armed members 102 and 102' are mounted on the plate member 97. Each member 102 and 102' includes, respectively, an elongated base portion 103 and 103', a first arm 104 and 104', a middle arm 105 and 105' the ends of which are bent so as to extend away from the first arms 104 and 104', and a third arm 106 and 106' which extend diagonally away from the elongated base portions 103 and 103'. The two three-armed members 102 and 102' are disposed on the plate member 97 in forwardly and rearwardly spaced apart relationship and with their arms extending generally toward each other. Each member 102 and 102' is provided, respectively, with a pivotal connection to the plate member 97 at the intersection of the elongated base portion 103 and 103' and the first arm 104 and 104', as indicated at 107 and 107'. The pivotal connections 107 and 107' are spaced equidistantly from the center of the plate 97 and, respectively, forwardly and rearwardly thereof. The base portions 103 and 103' of the three-armed members 102 and 102' each extends across one of the slots 99 formed in the plate member 97 and each is provided with a downwardly bent ear 108 and 108', respectively, which extends downwardly through the associated slot 99. A spring member 110 and a spring member 110' are each interconnected, respectively, between the downwardly bent ears 108 and 108' and downwardly bent ears 111 and 111' formed at the outermost edge of the plate member 97 whereby to normally bias the three-armed members 102 and 102' toward their positions shown in FIG. 4.

The end of each of the first arms 104 and 104' is provided with a recess 109 and 109' in which are pivotally mounted gear indexing pawls 112 and 112', respectively. With the three-armed members 102 and 102' in their normal positions (FIG. 4) the pawls 112 and 112' are disengaged from the gear 91 no matter which position the plate member 97 is in. Each pawl 112 and 112' is pivotal about a mounting pin 113 and 113' disposed in the recesses 109 and 109', respectively, between a first position in which it is engageable between adjacent teeth of the gear 91 to cause rotation thereof upon pivoting movement of its associated three-armed member and a second position in which it may be moved relative to the gear 91 without causing rotation thereof. Each pawl 112 and 112', in its first position, has a portion engageable with a wall portion 117 and 117' of each recess 109 and 109' to insure positive rotation of the gear 91 when the three-armed members 102 and 102' are rotated from their normal positions. The sides of the pawls 112 and 112' opposite the portions engageable with the wall portions 117 and 117' are provided with cam surfaces which are engageable with opposite ends of a spring mounted bar member 118 on the plate 97 for a reason to be described hereinafter.

When the plate member 97 is disposed in its central position and the three-armed members 102 and 102' are in their normal positions, the bent ends of the middle arms 105 and 105' are disposed substantially equal distances from a vertical transverse plane extending through the axis of the indexing gear 91. Further, the bent end portions of the middle arms 105 and 105' are the portions of their respective members 102 and 102' positioned most closely adjacent to each other when the three-armed members 102 and 102' are in their normal positions.

The elongated bar member 70 of the slide carrier 68 is reciprocal immediately beneath the plate member 97 and in the vertical transverse plane extending through the axis of the indexing gear 91. Provision is made for actuating either one of the three-armed members 102 and 102' during the final portion of the outward movement of the slide carrier 68 whereby to rotate the gear 91 and index the slide tray 36 either forwardly or rearwardly one slide storage position. A pair of upstanding pins 114 and 115 are mounted in spaced apart relationship on the inner end of the elongated bar member 70. The pins 114 and 115 are adapted to selectively engage the arms of either the member 102 or the member 102' to index the slide tray 36, as will be fully described herein. A relatively wide slot 116 is formed in the inner edge of the plate member 97 to permit unrestricted movement of the pins 114 and 115 with the slide carrier 68.

When the plate member 97 is in its rearwardmost position (to the left as viewed in FIG. 4), the pins 114 and 115 actuate the three-armed member 102 whereupon the slide tray 36 is indexed forwardly one position each time the slide carrier 68 is moved outwardly. With the plate member 97 in its forwardmost position, the pins 114 and 115 are adapted to actuate the three-armed member 102' whereby to index the slide tray 36 rearwardly one position upon each outward movement of the slide carrier 68.

When the plate member 97 is in its rearwardmost position for indexing the slide tray 36 forwardly of the projector, the bent end of the middle arm 105 of the member 102 is positioned immediately above the elongated bar member 70 of the slide carrier 68 when the member 102 is in its normal position, with the end of the third arm 106 being positioned slightly away from the bar member 70. During the final portion of the outward movement of the slide carrier 68, that is, after the slide 35 has been fully returned to its position in the slide tray 36, the slide tray is indexed one position to advance the next slide into alignment for movement into the projector.

This indexing movement of the slide carrier 68 may be broken down into three successive portions. During the first portion of this indexing movement, the pin 114 engages the bent end of the middle arm 105 of the member 102 and pivots the member 102 from its normal position counter-clockwise, as viewed in FIG. 4. This first portion of the pivoting movement of the member 102 positions the pawl 112 on the first arm 104, which pawl is in its first or gear-rotating position, between a pair of adjacent teeth of the gear 91 and simultaneously positions the end of the third arm 106 for engagement by the pin 115.

During the second portion of the indexing movement of the slide carrier 68, the pin 115 engages the end of the third arm 106 and further pivots the member 102 counter-clockwise whereby to cause the pawl 112 to rotate the gear 91 one position in a clockwise direction, as viewed in FIG. 4, and thereby to index the slide tray 36 in a forward direction whereby to position the next slide in the tray in alignment with the vertical slide aperture 40 in the projector casing 20. After the second portion of the indexing movement, the pin 114 again engages a portion of the arm 105 for the third and final portion of the indexing movement and pivots the member 102 to a position wherein the pawl 112 is clear of the gear 91.

The three-armed members 102 and 102' are so designed that there is no interference therebetween when they are pivoted during the indexing operation. A conventional spring-urged ball detent device is preferably associated with the gear 91 to insure that the gear 91 is rotated one position only upon each outward movement of the slide carrier 68. This detent device includes a ball 120 which is mounted in a bore formed in a portion of the casing 20 and is resiliently urged against the gear 91 by a spring disposed in the bore.

Upon inward movement of the slide carrier 68, the three-armed member 102 is returned to its normal position through engagement of the pin 114 with the inner surface of the third arm 106 and as a result of the action of the spring 110. During the return movement of the three-armed member 102, the pawl 112 is rotated, through engagement with the detent-held gear 91, to its second position away from the wall portion 117 whereby there will be no reverse indexing of the gear 91. As the three-armed member 102 returns to its normal position, the cam surface on the pawl 112 engages one end of the spring mounted bar member 118 whereby the pawl 112 is automatically pivotally returned to its first or gear-rotating position against the wall portion 117 and is thus properly positioned for the next indexing operation.

When the plate member 97 is in its forwardmost position, the arms of the member 102' are positioned for engagement by the pins 114 and 115 during outward movement of the slide carrier 68 in the same manner described hereinafter for the member 102 whereby to rotate the gear 91 in a counter-clockwise direction, as viewed in FIG. 4, to index the slide tray 36 rearwardly of the projector 20.

With the structural arrangement disclosed herein, a maximum mechanical advantage is utilized for the actual work of indexing the slide tray 36 and a lesser mechanical advantage is utilized for positioning the members 102 and 102' for the actual indexing operation and for clearing the pawls 112 or 112' away from the gear 91 at the end of the actual indexing operation. The pin 114 engages the relatively short lever arms 105 and 105' to position the pawls 112 or 112' between a pair of adjacent teeth of the gear 91 and simultaneously to position the third arms 106 or 106' for engagement by the pin 115. The pin 115 then engages the longer lever arms 106 or 106', which results in a substantially greater mechanical advantage, during the actual work of rotating the gear 91 and indexing the tray 36.

Provision is made for either manually or automatically and remotely positioning the plate member 97 in either its forward indexing or rearward indexing positions. The mechanism for manually changing the position of the plate member 97 includes a bearing sleeve 125 (FIG. 4) rigidly mounted in a well-known manner in an opening formed in the portion of the casing 20 defining the outer wall of the slide-tray-receiving groove 21, a rotatable or rockable shaft 126 extending through the bearing sleeve 125, and a manually operable knob 127 secured on the outer end of the shaft 126. A crank member 128 is secured at one of its ends to the inner end of the shaft 126. A motion transmitting member 132 is connected between the other end of the crank member 128 and an ear 131 formed on the outermost edge of the plate 97. In the form of the invention shown in the drawings, the motion transmitting member 132 comprises a rigidly formed wire element. Thus, the direction in which a slide tray is to be indexed may be controlled manually by merely turning the knob 127 between its forward and reverse positions. The mechanism and control means for automatically and remotely shifting the plate member 97 will be fully disclosed hereinafter.

Preferably, the plate member 97 should be shifted between its two positions for reversing the direction in which the slide tray is to be indexed when the slide carrier 68 is in its innermost position whereby the three-armed members 102 and 102' will be in their normal positions. When the slide carrier 68 is in its outermost position, one of the three-armed members 102 or 102' will be in its pivoted position toward the indexing gear 91. Inward movement of the slide carrier 68 after the plate member 97 has been shifted from its forward indexing to its rearward indexing position, for example, might tend to cause interference or jamming between the pin 114 and the members 102 and 102'. Therefore, as a safety or precautionary measure, provision may be made for returning the members 102 and 102' to their normal positions when the plate member 97 is shifted with the slide carrier 68 in its outermost position whereby to insure against any jamming of the slide carrier 68 when it is thereafter moved inwardly.

As illustrated in FIG. 4, the three-armed members 102 and 102' are provided with cam-like extensions 136 and 136' which, when the members 102 and 102' are in their normal positions extend generally toward the outer wall of the casing 20 with the outer edges thereof being disposed adjacent the inner ends of the slots 99 formed in the outer edge of the plate member 97. When the slide carrier 68 is moved to its outermost position with the plate member 97 in its rearmost or forward indexing position for actuation of the member 102, the member 102 will be in its pivoted position after having indexed a slide tray one position forwardly with the cam-like extension 136 disposed adjacent the corresponding boss 96 (the lower right hand boss in FIG. 4). If the plate member 97 should be shifted into its forwardmost or rearward indexing position before the slide carrier 68 has been moved inwardly, the cam like extension 136 will abut against the adjacent boss 96 whereby to pivotably return the three-armed member 102 to its normal position. This pivoting movement of the member 102, which is also aided by the spring 110, causes partial inward movement of the slide carrier 68, first as a result of engagement of the pin 114 by the middle arm 105 of the member 102 and then as a result of engagement of the pin 115 by the third arm 106. This inward movement of the slide carrier 68 prevents the pin 114 from being jammed behind the middle arm 105 and 105' of either the member 102 or 102' should the plate 97 be shifted between its two limit positions when the slide carrier 68 is in its outermost position.

If, however, the pin 114 should ever be disposed behind the middle arm 105 or 105' of either of the three-armed members 102 and 102' when the slide carrier 68 is in its outermost position, the spring mounted bar member 118 permits either the member 102 or 102' to be pivoted in a direction away from the indexing gear 91 from its normal position when the slide carrier 68 is moved inwardly as a result of engagement of the pin 114 with the back side of either the middle arm 105 or 105' whereby to permit movement of the pin 114 past either the middle arm 105 or 105'. This feature additionally insures against jamming of the slide-tray-indexing mechanism.

Manual operation of the projector disclosed herein is extremely simple. After the projector has been plugged into a suitable wall socket to energize the lamp 23 and the fan motor 32, the knob 127 is turned to either its forward indexing or rearward indexing position. The slide carrier 68 is then manually moved to its outermost position by means of the handle 72, after which the slide tray 36 is set down into the slide-tray-receiving groove 21 with any particular slide aligned with the vertical slide aperture 40 and with the rack 93 on the tray 36 in engagement with the indexing gear 91. The slide carrier 68 may then be manually reciprocated by means of the handle 72 whereby to provide a sequential showing of the slides 35 stored in the tray 36, the slide tray 36 being indexed in the proper direction after the showing of each slide.

The present invention is primarily concerned with the provision of means for automatically and remotely controlling the operation of a projector of the type disclosed herein. More specifically, the present invention is concerned with means for remotely controlling (1) the movement of the slide carrier and the operation of the slide-tray-indexing mechanism, (2) the movement of the plate member 97 of the slide-tray-indexing mechanism whereby to reverse the direction in which a slide tray will be indexed, and (3) focusing movement of the lens housing 27. Further, the present invention is concerned with the provision of an adjustable automatic timer in a projector of the type disclosed herein whereby a sequence of slides may be shown automatically with each slide being projected on a screen for a uniform predetermined period of time.

The structure permitting motorized operation of the slide-changing mechanism and, therefore, the slide-tray-indexing mechanism may be best described with reference to FIGS. 2, 8–12, and 28. A vertically disposed plate member 165 is secured by suitable fastening means to the projector base plate 31 with the plate member 165 extending transversely of the projector casing 20 and being disposed forwardly of the upstanding plate 71 on the slide carrier 68 when the slide carrier is in its innermost position. A low voltage A.C. motor 166, which is mounted in a suitable manner on the front surface of the plate member 165, serves to reciprocate the slide carrier 68 for each slide transfer cycle and will hereafter be referred to as the cycle motor 166. The cycle motor 166 is operably connected for reciprocating the slide carrier 68 through a planetary gear train which includes a stationary sun gear 168 which is integrally formed in a plate member 169 which is secured to the rear surface of the plate member 165 by suitable fastener means whereby the plate member 169 is spaced rearwardly of and parallel to the plate member 165. A stub shaft 170 is mounted in the plate member 165 and extends rearwardly in axial alignment with the center of the sun gear 168. A spur gear 171 having a pitch diameter less than that of the sun gear 168 is rotatably mounted on the shaft 170 between the plate member 165 and the plate member 169. The spur gear 171 is disposed in meshed driving engagement with a smaller spur gear 172 which is rotatably mounted on a stub shaft 173 which projects rearwardly from the plate member 165. A second spur gear 175 mounted on the shaft 173 and connected to the spur gear 172 for rotation therewith is adapted for meshed driving engagement with a small gear 176 secured on the drive shaft 177 of the cycle motor 166. The gear 176 drivingly engages the gear 175 when the cycle motor 166 is energized and is disengaged therefrom when the cycle motor 166 is de-energized, as at the end of a slide changing cycle. Thus, during operation of the cycle motor 166, the spur gear 171 will be rotated by the gear train including gears 176, 175 and 172.

A planet gear 179 having a pitch diameter equal to one-half the pitch diameter of the sun gear 168 is rotatably mounted on a pin 180 which projects rearwardly from the rear face of the spur gear 171. The pin 180 is located on the spur gear 171 at a point substantially midway between the center of the sun gear 168 and the pitch diameter thereof whereby the planet gear 179 is meshed in driving engagement with the sun gear 168. A radially extending arm 181 is secured to the rear surface of the planet gear 179 with its outer end projecting somewhat beyond the pitch diameter thereof and having a rearwardly extending drive pin 182 secured thereon. The arm 181 is so positioned on the planet gear 179 that when the center of the planet gear 179 is horizontally aligned with the center of the sun gear 168, the pin 182 is disposed in the same horizontal plane therewith.

With the structural arrangement disclosed herein, each revolution of the spur gear 171 will result in a generally elliptical path of movevment for the drive pin 182 toward and away from the optical axis of the projector, which elliptical path is horizontally oriented or flattened as illustrated in dashed lines in FIGS. 9–12. More specifically, when the spur gear 171 is rotated in a clockwise direction (as viewed in FIG. 8) during operation of the cycle motor 166, the mounting pin 180 for the planet gear 179 will be rotated in a clockwise direction about the center of the sun gear 168 with the planet gear rotating in a counter-clockwise direction about the pin 180. As somewhat diagrammatically illustrated in FIGS. 9–12 wherein the structure is viewed from the front of the projector, the drive pin 182 moves from its outermost position in horizontal alignment with the center of the sun gear 168 toward the optical axis of the projector in a curved path below the center of the sun gear 168 with the pin 182 swinging first downwardly and then upwardly into its innermost position toward the optical axis x—x of the projector, in which position (FIG. 11) the drive pin 182 is also in horizontal alignment with the center of the sun gear 168. Further rotation of the planet gear 179 results in the pin 182 moving outwardly in a curved path above the center of the sun gear 168 with the pin 182 swinging first upwardly and then downwardly into its initial outermost position shown in FIG. 9. FIGS. 9–12 illustrate sequentially four positions of the drive pin 182 and its generally elliptical path during one complete slide changing cycle as a result of one complete revolution of the spur gear 171.

Means, which will be fully described hereinafter, are provided whereby the drive pin 182 serves to reciprocate the slide carrier 68 during motorized operation of the projector. As will be evident hereinafter, the linear distance between the innermost and outermost horizontally aligned positions of the drive pin 182 determines the throw or slide transfer movement of the slide carrier 68. Thus, the location of the drive pin 182 in relation to the center of the planet gear 179 is determined by the slide carrier movement necessary to transfer a slide 35 from the slide tray 36 to a viewing position in centered alignment with the slide viewing aperture 43.

For operably connecting the drive pin 182 to the slide carrier 68 during motorized operation of the projector, a hook member 185 is pivotably mounted on the front surface of the upstanding plate 71 of the slide carrier 68 by means of a pin 186. The hook portion 187 of the hook member 185, when the hook member is disposed generally horizontally, projects slightly beyond the outer edge of the upstanding plate member 71. A stop member 188 on the plate 71 serves to prevent downward pivoting movement of the hook member 185 below its horizontally disposed position.

Figure 8:
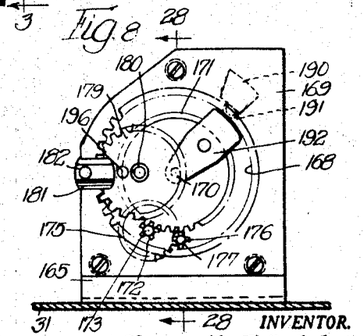
FIG. 8 is a rear elevational view of the planetary gear system taken generally on the line 8—8 of FIG. 2 with the drive pin thereof shown in its position furthest from the optical axis of the projector.
Figure 9:
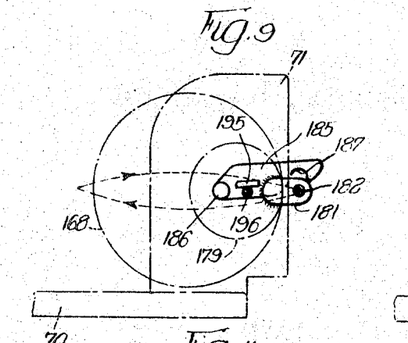
FIGS. 9–12 are diagrammatic views looking from the front of the projector showing four positions of the planet gear of the planetary gear system and the drive pin carried thereon and four corresponding positions of the hook member carrier on the slide carrier during one complete revolution of the planet gear or one complete slide transfer cycle whereby to illustrate the half-cycle of operable engagement between the drive pin and the hook member, the generally elliptical path of movement of the drive pin being shown in dashed line.
Figure 10:
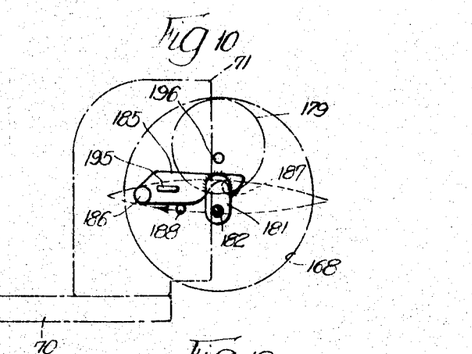
Figures 11, 12:
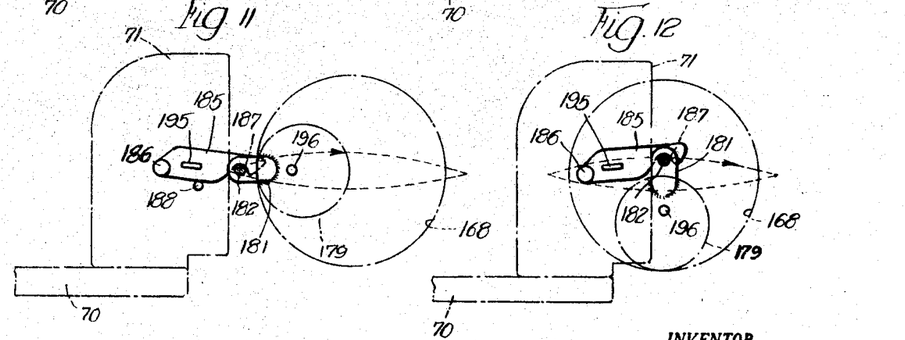
Figure 13:
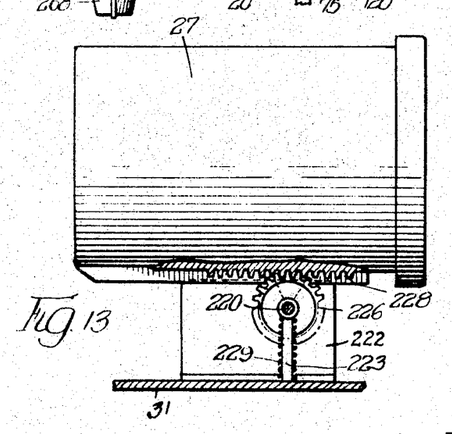
FIG. 13 is an enlarged vertical section taken generally on the line 13—13 of FIG. 2.

When the cycle motor 166 is energized and the drive pin 182 is in its outermost position, as illustrated in FIGS. 8 and 9, and the slide carrier 68 is in its innermost position, the drive pin 182, which projects rearwardly past the outer edge of the upstanding plate member 71, when swinging downwardly during its curved path of movement toward the optical axis x—x engages the outer edge of the upstanding plate member 71 whereby to move the slide carrier 68 into its outermost position. When the drive pin 182 swings upwardly into its innermost position (FIG. 11), it engages the hook portion 187 of the hook member 185 whereby as the drive pin 182 moves outwardly in its upwardly curved path it pulls the slide carrier 68 into its innermost position to transfer a slide from the slide tray 36 to the viewing position in centered alignment with the slide viewing aperture 43. The hook member 185 is free to pivot upwardly whereby to accommodate the upwardly curved path of the drive pin 182.

When the drive pin 182 reaches its outermost position, after a slide has been positioned in viewing position in the projector, the cycle motor 166 is automatically stopped whereby the slide will remain in viewing position until such time that the cycle motor 166 is again energized. For automatically stopping the cycle motor 166 each time the slide carrier 68 reaches its innermost position, a normally closed cycle-hold switch 190 (FIG. 8) is mounted between the plate members 165 and 169 and is provided with a pivotably mounted actuating member 191 which is spring urged toward the center of the sun gear 168. A radially disposed cam arm 192 is secured on the rear face of the spur gear 171 with the outer end thereof adapted to be rotated into switch actuating contact with the actuating member 191 whereby to open the switch 190. The cam arm 192 is so positioned on the spur gear 171 that it contacts the switch actuating member 191 simultaneously as the drive pin 182 reaches its outermost position whereby to actuate the switch 190 and stop the cycle motor 166 at the end of each slide changing cycle.

Provision is made for automatically disengaging the hook member 185 from the drive pin 182 simultaneously as the drive pin 182 reaches its inner most position whereby the slide carrier 68 is completely disengaged from the drive pin 182 at the completion of each slide changing cycle. Thus, the slide carrier 68 may, if desired, be reciprocated manually by means of the handle 72 with the hook member 185 and the drive pin 182 being fully disengaged whereby to prevent any jamming or damage to the gear train or to the cycle motor 166. The hook member 185 is provided intermediate its hook portion 187 and the pivot pin 186 with a horizontal extending forwardly directed flange 195. The rear face of the planet gear 179 is provided with a rearwardly extending pick-up pin 196 which is disposed on a radial line extending between the drive pin 182 and the pin 180 upon which the planet gear 179 is rotatably mounted. Simultaneously as the drive pin 182 reaches its outermost position, the pick-up pin 196, which is swinging arcuately upwardly from its position in FIG. 12 to its position in FIG. 9, engages the underside of the flange 195 on the hook member 185 whereby to raise the hook member 195 out of its hooked engagement with the drive pin 182. The slide carrier 68 is thus disengaged from the planetary gear system whereby to permit manual reciprocation of the slide carrier 68, if desired. As previously described herein, the drive pin 182 does not again become engaged with the hook member 185 until it reaches its innermost position half-way through the next slide changing cycle.

Instead of the described hook-member-disengaging means, clutch means could be provided for automatically disengaging the cycle motor 166 from the gear train during manual reciprocation of the slide carrier 68. With such an arrangement, the generally elliptical path of movement of the drive pin 182 would prevent jamming of the slide-changing mechanism due to a "dead-center" condition during manual operation. Such a "dead-center" condition could be a problem if the drive pin 182 were reciprocal in a purely horizontal path.

The electrical remote control circuit for the cycle motor 166 and the cycle-hold switch 190 will be fully described hereinafter.

A novel solenoid-actuated over-center linkage system 200 is provided for shifting the plate member 97 of the slide-tray-indexing mechanism between its forward and rearward indexing positions. As is best illustrated in FIGS. 4 and 16–19, a bracket 201 is secured to the underside of the portion of the upper casing 20 of the projector defining the bottom of the slide-tray-receiving groove 21. A solenoid 203 is attached to the bracket 201 in a suitable manner with the axis thereof extending transversely of the projector casing 20. When the solenoid 203 is de-energized, a solenoid armature or plunger 204 disposed therein is resiliently urged outwardly of the solenoid 203 by a light coil spring 205. When the solenoid 203 is energized, the armature 204 is shifted inwardly of the solenoid 203 against the action of the spring 205.

A generally T-shaped link member 206 having a leg portion 207 and a cross bar portion 208 is pivotally mounted intermediate the ends of its leg portion 207 on a pin 209 mounted on a portion of the bracket 201. The pivot point 209 for the T-shaped link member 206 is in alignment with the axis of the solenoid 203 and the leg portion 207 thereof extends generally toward the outer end of the solenoid armature 204. The cross bar portion 208 of the T-shaped link member 206 is provided on its undersurface with an arcuate cam groove 210 with the arc of the groove 210 opening toward the leg portion 207 of the T-shaped link member 206. The T-shaped link member 206 is pivotal between two limit positions relative to a reference line y defined by an extension of the axis of the solenoid 203, which limit positions are spaced equidistantly from this reference line and on opposite sides thereof. It is noted, however, that during pivoting movement of the T-shaped link member 206 between its limit positions, the ends of the cam groove 210 do not move across the reference line y. An elongated link member 214 underlies the T-shaped link member 206 and has one end pivotably connected to the outer end of the solenoid armature 204. The opposite end of the link member 214 extends across the cam-shaped groove 210 and is provided with an upwardly extending projection 215 which is received in the cam groove 210.

Figure 16:
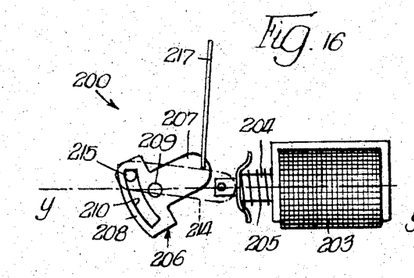
FIGS. 16–19 are somewhat diagrammatic plan views illustrating the four operable positions of the link members of the over-center linkage system shown in FIG. 4.
Figure 18:
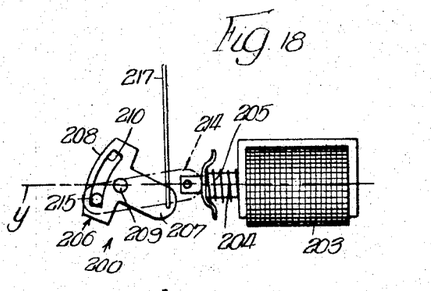

When the solenoid 203 is de-energized, the T-shaped link member 206 is disposed in either one of its two pivoted limit positions, as illustrated in FIGS. 16 and 18. In FIG. 4, the T-shaped link 206 is shown positioned midway between its two limit positions inasmuch as the plate member 97 of the slide-tray-indexing mechanism is shown in a central position. As a result of the spring member 205 urging the solenoid armature 204 and the attached link member 214 outwardly away from the solenoid 203, the projection 215 on the link member 214 is cammed into the end of the groove 210 which is spaced furthest from the outer end of the armature 204. As is evident in FIGS. 16 and 18, with the T-shaped link member 206 in either one of its limit positions, the end of the cam groove 210 spaced farthest from the end of the armature 204 is also positioned closest to the reference line y.

Figure 17:
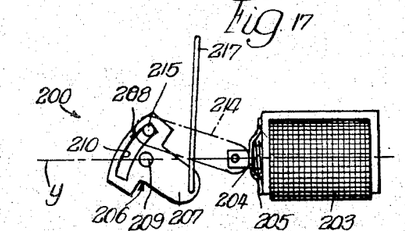
Figure 19:
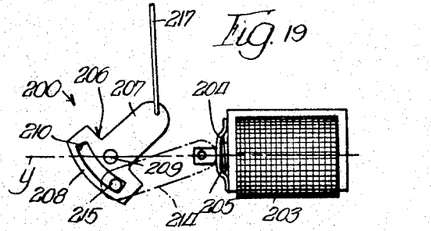

Operation of the over-center linkage system 200 may best be described with reference to FIGS. 16-19. First, assume that T-shaped link 206 to be in the limit position shown in FIG. 16 with the solenoid 203 de-energized whereby the link member 214 is cammed into the position shown. When the solenoid 203 is energized, the armature 204 and the attached link member 214 are shifted inwardly of the solenoid 203 whereby the engagement of the projection 215 in the one end of the groove 210 serves to pivot the T-shaped link member 206 into its other limit position, as shown in FIG. 17. When the solenoid 203 is then de-energized, the armature 204 and the attached link member 214 are resiliently urged outwardly whereby the projection 215 is cammed across the reference line y and into the opposite end of the groove 210 which is now positioned farthest from the outer end of the armature 204 and closest to the reference line y, as illustrated in FIG. 18. When the solenoid 203 is again energized, the T-shaped link member 206 is pivoted back into its first limit position, as shown in FIG. 19. When the solenoid 203 is again de-energized, the link member 214 is cammed back across the reference line y into the position shown in FIG. 16.

The end of the leg portion 207 of the T-shaped link member 206, which is movable through a considerable arc on opposite sides of the reference line y during pivoting of the T-shaped link member 206 between its two limit positions, is connected to the adjacent end of the plate member 97 by a motion-transmitting element which may be in the form of a rigid wire member 217. Thus, each time the solenoid 203 is energized and the T-shaped link member 206 is pivoted from one limit position to the other, the plate member 97 is shifted between its forward and rearward indexing positions.

The electrical circuit for remotely controlling operation of the solenoid-actuated over-center linkage system 200 will be fully described hereinafter. As described hereinbefore, the plate member 97 of the slide-tray-indexing mechanism may also be moved between its forward and rearward indexing positions manually by means of the forward-reverse knob 127.

Figure 24:
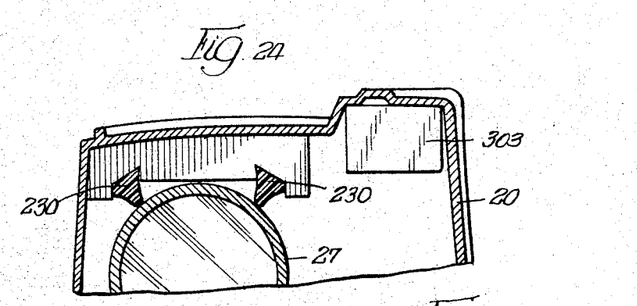
FIG. 24 is a fragmentary vertical transverse section taken generally on the line 24—24 of FIG. 1.

The projection lens focusing mechanism will now be described with reference to FIGS. 2 and 13-15. A horizontally extending shaft 220 extending transversely of the projector is rotatably supported in a V-groove formed in an upstanding bracket 222 and on an upstanding post 223, both of which are mounted on the base plate 31. One end of the shaft 220 extends through the side wall of the projector casing 20 defining the outer wall of the slide-tray-receiving groove 21 and has a knob 225 secured on the outer end thereof. A pinion gear 226 is secured on the shaft 220 intermediate the bracket 222 and the upstanding post 223 and substantially in alignment with the optical axis x—x of the projector. The underside of the lens housing 27 is provided with a longitudinally extending rack formation 228 whereby the lens housing 27 is supported on the pinion gear 226 with the rack formation 228 meshed in driving engagement with the gear teeth thereof. A spring 229 disposed about the upstanding post 223 serves to resiliently retain the upper surface of the lens housing 27 against a pair of longitudinally extending laterally spaced parallel slide rails 230 as illustrated in FIG. 24. The rails 230 which are secured to the underside of the top wall of the upper casing 20 by suitable supporting structure may be formed of plastic, nylon or the like. Thus rotation of the shaft 220 serves to slidably move the lens housing 27 either forwardly or rearwardly depending upon which direction the shaft 220 is rotated whereby to permit adjusting the projector focus.

Provision is made for rotating the shaft 220 either manually or remotely by means of a reversible D.C. motor 231 (FIG. 2). The motor 231 is supported on an upstanding bracket 232 which is secured to the projector base plate 31. A worm 233 is secured to the drive shaft of the motor 231 and is meshed in driving engagement with a worm gear 234 which is secured on a stub shaft 235 rotatably supported on the bracket 232. A gear 237 is secured on the other end of the stub shaft 235 and is meshed in driving engagement with a gear 238 which is secured on one end of a shaft 239 which is rotatably supported between the brackets 222 and 232. A gear 240 which is secured on the other end of the shaft 239 is meshed in driving engagement with a gear 241 which is rotatably mounted on the inner end of the shaft 220.

Figure 14:
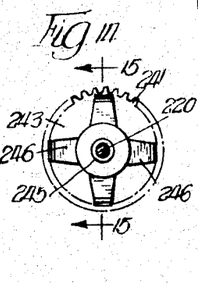
FIG. 14 is an enlarged vertical section taken generally on the line 14—14 of FIG. 2.
Figure 15:
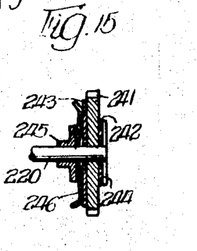
FIG. 15 is a vertical section taken generally on the line 15—15 of FIG. 14.

To permit either manual or motorized rotation of the shaft 220 and thus manual or remote control focusing adjustment of the lens housing 27, the gear 241 is operably connected to the shaft 220 by means of a friction-clutch device, best illustrated in FIGS. 14 and 15. A pair of discs 242 and 243 of friction material are disposed against opposite faces of the gear 241. A flat plate member 244 is secured on the end of the shaft 220 against the outer surface of the friction disc 242. A collar 245 which is secured on the shaft 220 on the opposite side of the gear 241 serves to retain a four-armed spring device 246 against the outer face of the friction disc 243. Thus, when the shaft 220 is rotated manually by means of the focus knob 225, the gear 241 remains stationary with the shaft 220 rotating relative thereto to slidably adjust the lens housing 27 either forwardly or rearwardly. When the motor 231 is actuated to rotate the gear 241, the friction-clutch device operably connected between the gear 241 and the shaft 220 serves to rotate the shaft 220 whereby to adjust the position of the lens housing 27. The drive shaft of the motor 231 may rotate in either direction depending upon the direction of the D.C. current directed to the motor 231 whereby the gear 241 may be rotated in opposite directions to either move the lens housing 27 forwardly or rearwardly for focusing adjustment thereof. The remote control circuit for actuating the focus motor 231 will be fully described hereinafter.

A remote control handpiece 250 (FIGS. 20–22) for use with the foregoing projector is of a size and shape to readily fit in a person's hand. The handpiece or hand control 250 is provided with an extended length of conductor cord 251 having a plug (not shown) at one end thereof whereby to permit connecting the handpiece 250 to a socket (not shown) provided in the rear wall of the projector casing 20. A series of conductors extend through the cord 251 and are connected in the usual manner to prongs of the plug. The handpiece 250 includes a lower casing 254 and an upper casing 255 adapted to be secured together by suitable threaded fasteners. The top wall of the upper casing 255 is provided at the forward end of the handpiece 250 with a generally rectangular opening 256 in which is received three switch actuating buttons or members 257, 258 and 259 which are adapted to be actuated by the thumb. Briefly, the switch actuating member 257 bears the legend "cycle" and is adapted for initiating operation of the cycle motor 166. The switch actuating member 258 bears the legend "forward-reverse" and is adapted for controlling energization of the solenoid 203 and thereby the direction in which a slide tray is to be indexed. The switch actuating member 259 which may be actuated in two directions bears the legend "focus" and is adapted for controlling forward and rearward operation of the focusing motor 231 and thereby remote control focusing adjustment of the lens housing 27. The structural details of the switch members within the handpiece 250 will be fully described hereinafter.

Figure 23:
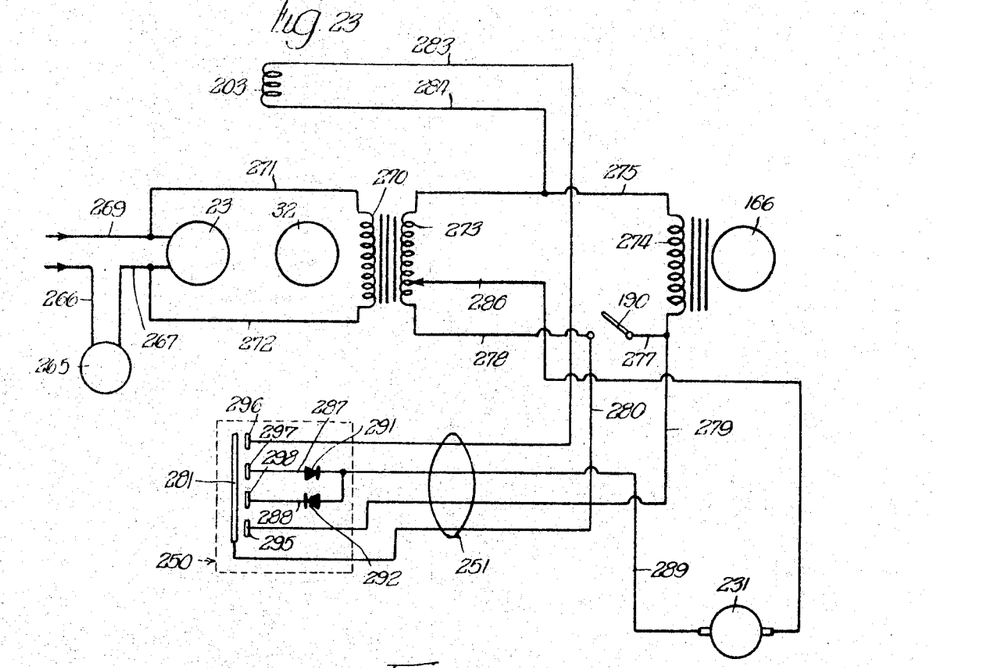
FIG. 23 is a circuit diagram for the fully automatic projector utilizing the remote control handpiece shown in FIG. 22.

Remote control operation of the projector may best be described with reference to the circuit diagram shown in FIG. 23. The projector is provided with a power socket (not shown) whereby to permit the projector to be plugged into a suitable wall socket by means of a power cord 260. One terminal of the power socket is connected to one terminal of a main "off-and-on" switch 265 by a conductor 266 with the other terminal of the switch 265 being connected to one terminal of the projector lamp 23 by a conductor 267. The main switch 265 may be turned on and off by means of a control knob 268 disposed outwardly of the projector casing 20. The other terminal of the power socket is connected to another terminal of the projector lamp 23 by a conductor 269. One end of a primary coil 270 of the fan motor 32 is connected to the conductor 269 by a conductor 271 and the opposite end of the primary coil 270 is connected to the conductor 267 by a conductor 272 whereby the lamp 23 and the fan motor 32 are connected in parallel circuit relationship. Thus, when the projector is plugged into a wall socket and the main switch 265 is in its "on" position, the lamp 23 will be lit and the fan motor 32 will be operating.

As will be described, a secondary coil 273 of the fan motor 32 serves as the power source for the cycle motor 166 and the focus motor 231 and for energizing the slide-tray-indexing solenoid 203 during remote control operation of the projector. One terminal of a field coil 274 of the cycle motor 166 is connected to one terminal of the secondary coil 273 of the fan motor 32 by a conductor 275. The other end of the field coil 274 of the cycle motor 166 is connected to one terminal of the cycle-hold switch 190 by a conductor 277 with the other terminal of the switch 190 being connected to the other terminal of the secondary coil 273 of the fan motor 32 by a conductor 278. The "cycle" switch 295, 281 in the remote control handpiece 250 is connected in parallel circuit relationship with the cycle-hold switch 190 by a conductor 279 which is connected between the conductor 277 and a movable element 295 of the "cycle" switch 295, 281 and by a conductor 280 which is connected between the conductor 278 and a fixed conductor bar 281 in the handpiece 250. The "cycle" switch 295, 281 in the handpiece 250 is a normally open switch while the cycle-hold switch 190 is a normally closed switch. Thus, when the cycle motor 166 is not operating, it is because the cycle-hold switch 190 is retained in an open condition as a result of the cam arm 192 associated with the planetary gear system being in switch actuating engagement with the switch actuating member 191 of the cycle-hold switch 190.

To remotely control the operation of the slide changing mechanism of the projector, the "cycle" switch 295, 281 in the remote control handpiece 250 is momentarily closed whereby to complete a power circuit between the secondary coil 273 of the fan motor 32 and the field coil 274 of the cycle motor 166. This power circuit connected between opposite ends of the secondary coil 273 of the fan motor 32 includes the conductor 275, the field coil 274 of the cycle motor 166, the conductor 279, the closed "cycle" switch 295, 281, and the conductors 280 and 278. The "cycle" switch 295, 281 need only be closed momentarily inasmuch as the cycle-hold switch 190 will be permitted to close shortly after the cycle motor 166 starts to operate inasmuch as the cam arm 192 will then be rotated away from switch actuating engagement with the switch actuating member 191 of the cycle-hold switch 190 whereby to complete a second power circuit for the cycle motor 166. This second power circuit connected between opposite ends of the secondary coil 273 of the fan motor 32 includes the conductor 275, the field coil 274 of the cycle motor 166, the conductor 277, the closed cycle-hold switch 190, and the conductor 278. During each slide transfer cycle of operation of the cycle motor 166, the slide carrier 68 is first moved outwardly to its outermost position and then inwardly to transfer a slide from a slide tray to a position in centered alignment with the viewing aperture 43. Simultaneously as the slide carrier 68 reaches its innermost position, the cam arm 192 is rotated into switch actuating engagement with the switch actuating member 191 of the cycle-hold switch 190 whereby to open the switch 190 and, thus, open the power circuit for the cycle motor 166 whereby to stop the movement of the slide carrier 68 when in its innermost position and when a slide is positioned in viewing position. This slide will remain in viewing position until such time that the "cycle" button 257 in the handpiece 250 is again actuated whereby to initiate another slide transfer cycle with that slide being returned to its storage position in the slide tray and the next slide in sequence being transferred from the slide tray into viewing position in the projector.

The circuit for remotely controlling energization of the solenoid 203 of the slide-tray-indexing mechanism whereby to reverse the direction in which a slide tray is to be indexed includes a conductor 283 which is connected between one terminal of the solenoid 203 and a movable element 296 of the normally open "forward-reverse" switch 296, 281 in the remote control handpiece 250. The other terminal of the solenoid 203 is connected by a conductor 284 to the conductor 275 which is connected to one terminal of the secondary coil 273 of the fan motor 232. To remotely shift the plate member 97 of the slide-tray-indexing mechanism between its forward and rearward indexing positions, the "forward-reverse" switch 296, 281 in the handpiece 250 is momentarily closed whereby to complete a power circuit through the solenoid 203 and thereby energize the same. This power circuit connected between the opposite ends of the secondary coil 273 of the fan motor 32 includes the conductors 275 and 284, the solenoid 203, the conductor 283, the closed "forward-reverse" switch 296, 281, and the conductors 280 and 278. As previously described herein, each time the solenoid 203 is momentarily energized and then de-energized, the over center linkage mechanism 200 is actuated whereby to shift the plate member 97 between its forward and rearward indexing positions.

The circuit for remotely controlling operation of the focus motor 231 includes a conductor 286 which is connected between one terminal of the focus motor 231 and a center tap of the secondary coil 273 of the fan motor 32. A pair of movable switch elements 297 and 298 operable by the two-way "focus" button 259 in the remote control handpiece 250 are connected to a pair of conductors 287 and 288 which in turn are connected to the other terminal of the focus motor 231 by a common conductor 289. A rectifier 291 is connected to the conductor 287 and a rectifier 292 is connected to the conductor 288 with its polarity reversed relative to the rectifier 291. Thus, the direction of D.C. current flow to the focus motor 231 is determined by which of the movable switch elements 297 and 298 operable by the "focus" button 259 in the handpiece 250 is actuated to complete a power circuit. The power circuit connected across a portion of the secondary coil 273 of the fan motor 32 for actuating the focus motor 231 in one direction whereby to remotely adjust the lens housing 27 in one direction includes the conductor 286, the focus motor 231, the conductors 289 and 287, the rectifier 291, the movable switch element 297 of the "focus" switch, the conductor bar 281, and the conductors 280 and 278. The power circuit connected across the same portion of the secondary coil 273 of the fan motor 32 for actuating the focus motor 231 in the opposite direction whereby to remotely adjust the lens housing 27 in the opposite direction includes the conductor 286, the focus motor 231, the conductors 289 and 288, the rectifier 292, the other movable switch element 298 of the "focus" switch, the conductor bar 281, and the conductors 280 and 278.

Figure 22:
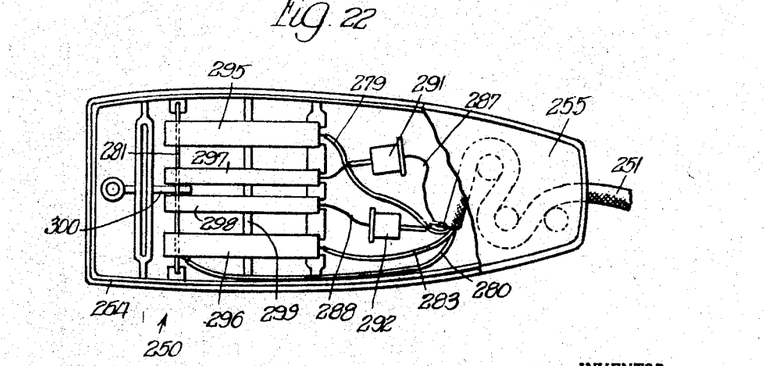
FIG. 22 is a top plan view thereof with the major portion of the upper casing removed.

As best illustrated in FIG. 22, the movable switch elements 295 and 296 of the "cycle" switch 295, 281 and the "forward-reverse" switch 296, 281, respectively, comprise resilient conducting strips which are connected at their rear ends to the conductors 279 and 283, respectively. Likewise, the movable switch elements 297 and 298 operable by the two-way "focus" button 259 comprise a pair of resilient conductor strips which are connected at their rear ends, respectively, to the conductors 287 and 288. The resilient conducting strips 295–298 are disposed longitudinally in the handpiece 250 in laterally spaced relationship. The rear ends of the conducting strips 295–298 (to the right as viewed in FIG. 22) are anchored by suitable means in the lower casing 254 with the strips 295–298 extending forwardly over a transversely extending fulcrum rib member 299 which is located approximately midway between the ends of the strips 295–298. The upper edge of the rib 299 is disposed above the anchored ends of the strips 295–298 whereby the forward ends of the strips are resiliently urged upwardly above the transversely extending conductor bar 281 which has one end connected to the conductor 280.

The "cycle" switch actuating member 257 is supported on the forward end of the conducting strip 295 whereby when the switch actuating member 257 is pressed downwardly to urge the forward end of the conducting strip 295 into contacting engagement with the conductor bar 281, the "cycle" switch 295, 281 is closed. Likewise, the "forward-reverse" switch actuating member 258 is supported on the forward end of the conducting strip 296 whereby when the same is pressed downwardly contact is made between the strip 296 and the conductor bar 281 to close the "forward-reverse" switch 296, 281. The "focus" switch actuating member 259 is supported on the forward ends of the two conducting strips 297 and 298 and above a centrally disposed longitudinally extending raised rib member 300. The switch actuating member 259 is tiltable or rockable to either side about the rib member 300 as a fulcrum whereby to provide contacting engagement between either the conducting strip 297 or the conducting strip 298 and the conductor bar 281 whereby to actuate the focusing motor 231 in either direction to shift the lens housing 27 either forwardly or rearwardly. The rib 300, which extends above the conductor bar 281, is provided with a slot through which the conductor bar 281 passes. When any of the switch actuating members 257, 258 or 259 are pressed downwardly, the forward ends of the conducting strips 295–298 are bent downwardly about the rib member 299 as a fulcrum into contacting engagement with the conductor bar 281. When the switch actuating members 257, 258 and 259 are released, the forward ends of the strips 295–298 spring upwardly whereby to break contact with the conductor bar 281.

The projector disclosed herein may be modified whereby to render it fully automatic as to the operation of the slide changing mechanism and the slide-tray-indexing mechanism by the provision of an adjustable timing device of any of the well-known types. Such a timing device, which is identified generally by a reference numeral 303 in FIG. 24, enables a sequence of slides to be shown automatically with all of the slides being shown for uniform predetermined time periods.

Figures 20, 21, 25:
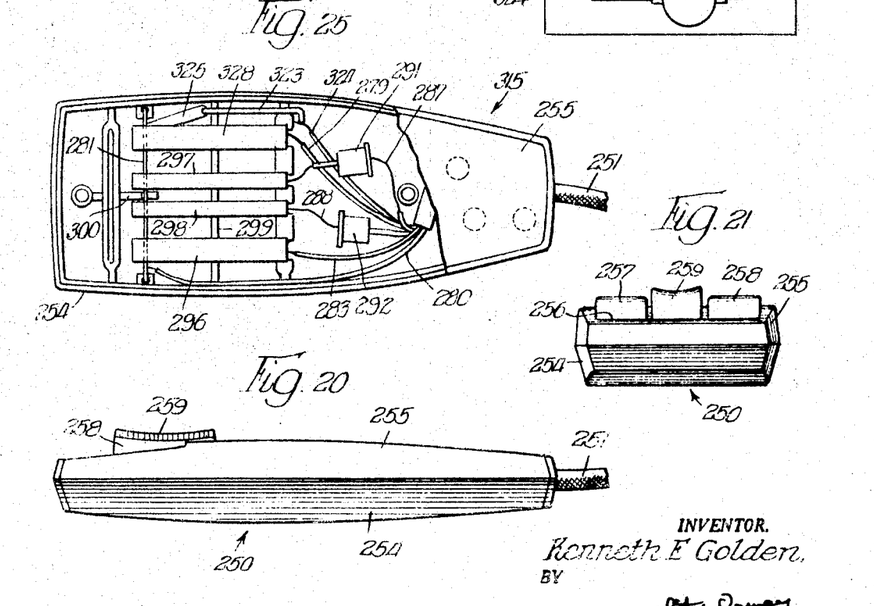
FIG. 20 is a full scale side elevational view of the remote control handpiece shown in FIG. 1.
FIG. 21 is a front end view thereof.
FIG. 25 is a plan view similar to FIG. 22 of a modified remote control handpiece for use with a fully automatic projector having an adjustable timer for controlling the time intervals the slides are projected on a screen.

The structure and operation of the modified form of the projector provided with the timing device 303 may best be described with reference to both FIG. 25 which illustrates a modified form of remote control handpiece 315 used with the timer-controlled projector and the circuit diagram of FIG. 26. As the focus control and slide-tray-indexing mechanisms are identical in both forms of the projector, the structural and circuit elements in FIGS. 25 and 26 which are identical to the corresponding elements in FIGS. 22 and 23 are identified by the same reference numerals. For instance, both the handpiece 250 of FIG. 22 and the handpiece 315 of FIG. 25 include the same upper and lower casings 254 and 255 and both are provided with the "forward-reverse" switch actuating member 258 and the "focus" switch actuating member 259. The "cycle" switch actuating button 257 of the handpiece 250 is replaced in the handpiece 315 by a switch actuating button 316 which bears the legend "eject" at its forward end and the legend "hold" at its rear end (FIG. 27).

Figure 26:
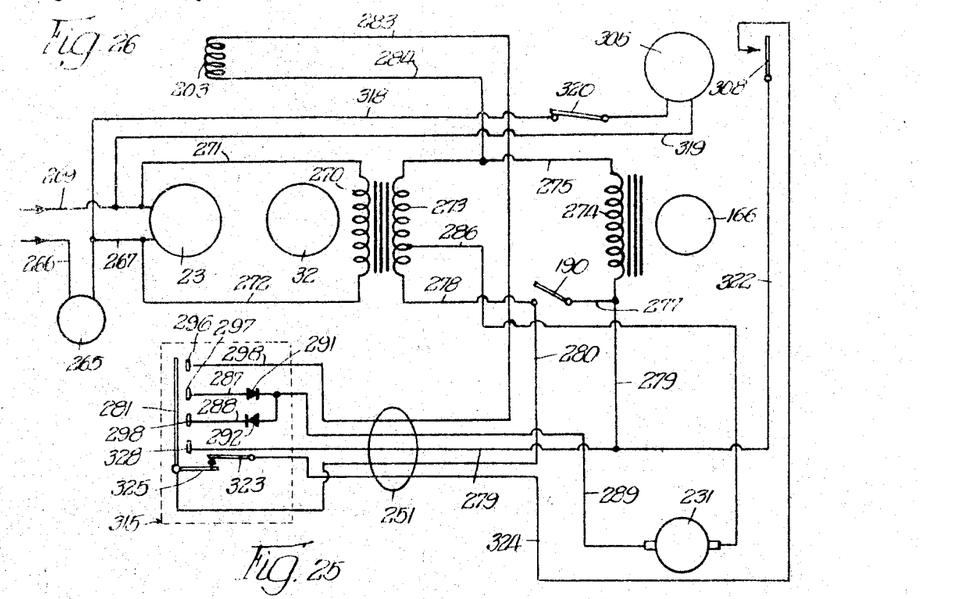
FIG. 26 is a circuit diagram similar to FIG. 23 for the timer-controlled projector utilizing the remote control handpiece shown in FIG. 25.
Figure 27:
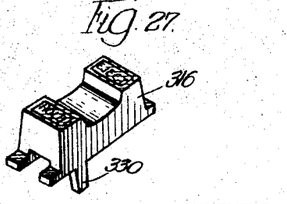
FIG. 27 is an enlarged perspective view of the "eject-hold" switch actuating member of the remote control handpiece shown in FIG. 25.
Figure 28:
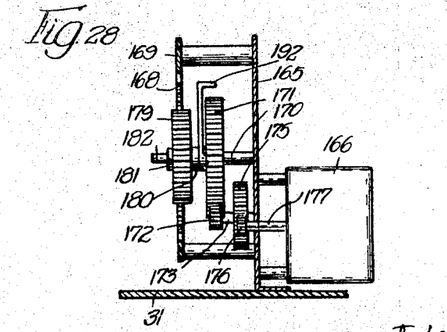
FIG. 28 is a vertical section through the planetary gear system taken generally on the line 28—28 of FIG. 8.

Briefly, the adjustable timing mechanism 303 includes, as shown in FIG. 26, a constant speed electric motor 305 and a normally open timer actuated cycle-start switch 308 disposed within the casing 20, which switch 308 is adapted to be momentarily closed at uniform intervals by cam means (not shown) rotatably driven by the timing motor 305. The switch 308 when closed serves to initiate operation of the cycle motor 166 as will be fully described. The timing mechanism 303 is provided with a control knob 310 (FIG. 1) which is disposed externally of the projector casing 20 and which is rotatably adjustable between an "off" position and a series of "on" positions whereby the slides may be automatically shown or projected for intervals of 5, 10, 15, or 30 seconds, for example.

With particular reference to the circuit of FIG. 26, the timing motor 305 is connected in parallel circuit relationship with the projector lamp 23 and the fan motor 32 by a conductor 318 which is connected to the conductor 267 and by a conductor 319 which is connected to the conductor 269. An "on-and-off" switch 320 which is controllable by the knob 310 is provided in the conductor 318. Thus, the timer motor 305 will be continuously operating when both the switch 320 and the main "on-and-off" switch 265 for the projector are closed. The cycle-start switch 308 which is periodically actuated by the cam means driven by the timer motor 305 has one terminal connected to the conductor 279 by a conductor 322 and its other terminal connected to a conductor bar 323 mounted in the remote control handpiece 315 by a conductor 324. A resilient conducting strip 325 which is secured at one end to the conductor bar 281 has its opposite end sprung upwardly into contacting engagement with the conductor bar 323. The timer-actuated cycle-start switch 308 is thus connected in parallel circuit relationship with the cycle-hold switch 190.

During operation of the projector under the control of the timing mechanism 303, the cycle-start switch 308 is momentarily closed by the cam means driven by the timing motor 305 whereby to complete a power circuit between the secondary coil 273 of the fan motor 32 and the field coil 274 of the cycle motor 166 whereby to energize the cycle motor 166 and initiate a slide transfer cycle of the slide carrier 68. The power circuit connected between the opposite ends of the secondary coil 273 of the fan motor 32 includes the conductor 275, the field coil 274 of the cycle motor 166, the conductors 279 and 322, the momentarily closed cycle-start switch 308, the conductor 324, the conductor bar 323, the conducting strip 325, the conductor bar 281, and the conductors 280 and 278.

As previously described herein, after the cam arm 192 has been rotated past the switch actuating member 191 of the cycle-hold switch 190 upon actuation of the cycle motor 166, the switch 190 is permitted to close prior to opening of the timer-actuated switch 308 whereby to complete the second power circuit for the cycle motor 166 through the switch 190, as previously described herein. At the completion of the slide-transfer cycle, the cycle-hold switch 190 is opened by the cam arm 192 being rotated into switch actuating engagement with the switch actuating member 191 simultaneously as the slide carrier 68 reaches its innermost position after having transferred a slide from a slide tray to a position in centered alignment with the viewing aperture 43. The slide will then remain in viewing position for the predetermined time interval for which the adjustable timing mechanism 303 has been set, after which the timer-actuated cycle-start switch 308 will again be closed whereby to initiate the next slide transfer cycle. Thus, with this timer controlled projector a full tray of slides may be projected in timed sequence in a fully automatic manner.

As it may be desirable during the showing of a sequence of slides to eject a particular slide prior to the termination of the predetermined viewing interval, provision is made for prematurely initiating the slide-transfer cycle by merely pressing downwardly on the forward end portion of the switch actuating member 316 (FIG. 27) which bears the legend "eject." This "eject-hold" switch actuating member 316 is supported on the forward end of a resilient conducting strip 328 which is anchored at its rear end and extends over the fulcrum rib 299. The rear end of the conducting strip 328 is connected to the conductor 279 whereby the "eject" switch 328, 281 is connected in parallel circuit relationship with both the cycle-hold switch 190 and the timer-actuated cycle-start switch 308. Thus, when the forward "eject" end of the switch actuating member 316 is pressed downwardly to provide contacting engagement between the forward end of the conducting strip 328 and the conductor bar 281, a power circuit is completed between the secondary coil 273 of the fan motor 32 and the field coil 274 of the cycle motor 166 prior to such a power circuit being established by the closing of the timer-actuated cycle-start switch 308 by the timing motor 305. This power circuit connected between the ends of the secondary coil 273 of the fan motor 32 includes the conductor 275, the field coil 274 of the cycle motor 166, the conductor 279, the conducting strip 328, the conductor bar 281, and the conductors 280 and 278. Thus, a particular slide may be readily ejected from its viewing position in the projector before the expiration of the viewing period for which the timing mechanism 303 had been previously set.

Provision is also made for holding or retaining a particular slide in viewing position in the projector for an interval longer than that for which the timing mechanism 303 had been pre-set. Thus, by pressing downwardly on the rear end portion of the switch actuating member 316 bearing the legend "hold," the power circuit for the cycle motor 166 which would normally be completed upon closing of the timer-actuated cycle-start switch 308 is opened whereby when the timer-actuated switch 308 is closed, the cycle motor 166 will not be energized to initiate the usual slide-transfer cycle. The "eject-hold" switch actuating member 316 is provided on its rear end portion with a depending leg portion 330 (FIG. 27) which is adapted when the rear end "hold" portion of the switch actuating member 316 is pressed downwardly to bear against the free end of the resilient conducting strip 325 whereby to disengage the same from its conducting engagement with the conductor bar 323. As the "slide-hold" switch 323, 325 is in series circuit relationship with the timer-actuated cycle-start switch 308, the previously described power circuit for the cycle motor 166 which is normally completed when the timer-actuated switch 308 is closed will be open. Thus, as long as the rear end "hold" portion of the switch actuating member 316 is pressed downwardly, closing of the timer-actuated switch 308 by the timing mechanism 303 will be ineffective to complete the power circuit between the secondary coil 273 of the fan motor 32 and the field coil 274 of the cycle motor 166, thus preventing initiation of the normal slide-transfer cycle. Upon release of the rear end "hold" portion of the switch actuating member 316, operation of the slide-transfer cycle of the projector will again be under the control of the timing mechanism 303.

The two forms of the projector disclosed herein may be fully controlled from a remote location by means of the appropriate one of the two remote control handpieces 250 and 315. The remote control handpiece 250 is used with a projector which is not provided with the timing mechanism 303 with the "cycle" switch actuating member 257 being utilized for remotely controlling the slide-transfer cycle, the "forward-reverse" switch actuating member 258 being utilized for remotely controlling the direction in which the slide tray is to be indexed, and with the "focus" switch actuating member 259 being utilized for controlling the focusing adjustment of the lens housing 27. The remote control handpiece 315 is used with a projector provided with the timing mechanism 303 with the slide-transfer cycle being automatically controlled in accordance with the setting of the timing mechanism 303 and with the "eject-hold" switch actuating member 316 being utilized for either prematurely ejecting a particular slide or for retaining a particular slide in viewing position for an extended period. The "forward-reverse" switch actuating member 258 and the "focus" switch actuating member 259 of the handpiece 315 serve the same functions as described for the handpiece 250.

It is noted that the projectors disclosed herein may be provided with adjustable legs of a type well-known in the art for either raising the forward end of the projectors or for tilting the projectors about a longitudinally extending axis for leveling purposes. Inasmuch as such adjustable legs form no part of the present invention, they have not been illustrated and described herein.

It will be understood that certain changes may be made in the construction or arrangement of the fully automatic remotely controlled slide projectors disclosed herein without departing from the spirit and scope of the invention as defined in the appended claims.

I claim:
1. In a slide projector having a slidably mounted forwardly and rearwardly adjustable lens housing whereby to permit focusing of a projected image, the improvement which comprises, a gear rack formed on the slidably mounted lens housing, a shaft rotatably mounted adjacent the lens housing and disposed at right angles to the direction of slidable movement thereof, a pinion gear secured on said shaft and meshed in driving engagement with the gear rack formed on the lens housing whereby rotation of said shaft in opposite directions results in forward and rearward focusing adjustment of the lens housing, one end of said shaft extending externally of the projector and having a knob thereon to permit manual focusing adjustment of the lens housing, a reversible D.C. focusing motor, a gear train operably connected between the drive shaft of said motor and a gear rotatably mounted on said shaft, a friction clutch interconnecting said shaft and said gear which is rotatably mounted thereon whereby to permit both manual and motorized focusing adjustment of the lens housing, and circuit means for said reversible D.C. focusing motor including conductors connecting an A.C. power supply and said motor in series circuit relationship across a pair of normally open forward and rearward focusing switches arranged in parallel circuit relationship with each of said pair of switches having a rectifier associated therewith, which rectifiers are connected with their polarities reversed, whereby closing the forward focusing switch actuates the focusing motor in a direction operable to shift the lens housing forwardly and closing the rearward focusing switch actuates the focusing motor in the opposite direction to shift the lens housing rearwardly.

2. In a slide projector having a slidably mounted forwardly and rearwardly adjustable lens housing whereby to permit focusing of the projected image, the improvement which comprises, a remote control handpiece electrically connected to the projector by a suitable length of conductor cord and provided with a two-way thumb actuated switch member, a reversible D.C. focusing motor operably connected to the slidably mounted lens housing for adjusting the same either forwardly or rearwardly of the projector, and a control circuit for actuating said reversible D.C. focusing motor including conductors connecting an A.C. power supply and the reversible focusing motor in series circuit relationship across a pair of normally open forward and rearward focusing switches mounted in the remote control handpiece and arranged in parallel circuit relationship with each of said pair of switches having a rectifier associated therewith, which rectifiers are connected with their polarities reversed, whereby closing the forward focusing switch by means of said two-way thumb actuated switch member actuates the focusing motor in a direction to shift the lens housing forwardly and closing the rearward focusing switch by means of said two-way switch member actuates the focusing motor in the opposite direction to shift the lens housing rearwardly.

3. In a slide projector having a horizontally disposed generally tubular lens housing movably mounted in the casing thereof for focusing adjustment, the improvement which comprises, a pair of parallel, laterally spaced, longitudinally extending slide rails secured to the underside of a top wall of the projector casing and disposed above the tubular lens housing, a shaft disposed in the projector casing below the lens housing and extending transversely to the axis of the lens housing, a pinion gear secured on said shaft and meshed in driving engagement with a rack formed on the underside of the lens housing with the lens housing being wholly supported by said shaft, means resiliently urging said shaft upwardly whereby the lens housing is resiliently retained against said slide rails, and means for rotating said shaft in opposite directions whereby to permit forward and rearward focusing adjustment of the lens housing.

4. In a slide projector of the type having a casing substantially enclosing a generally horizontally disposed tubular lens housing, the improved construction for adjustably mounting said lens housing comprising, guide means in said casing in engagement with said lens housing adjacent the upper portion thereof for guiding the same in either direction along a path parallel with the projector optical axis, a rectilinear member on the lower portion of said lens housing and extending in parallel relation with the projector optical axis, a rotary member supported by the projector casing and being in engagement with said rectilinear member for moving the lens housing in one direction upon rotation of said rotary member in one direction and for moving said lens housing in the other direction upon rotation of said rotary member in the other direction, the engagement between said rectilinear member and said rotary member serving as the sole means holding said lens housing in engagement with said guide means.

5. The improvement according to claim 4 wherein said rectilinear member comprises a gear rack and wherein said rotary member comprises a gear in meshing engagement with the rack.

References Cited by the Examiner

UNITED STATES PATENTS 2,055,696 9/1936 Marshall _________ 352—140
3,060,797 10/1962 Andreas __________ 88—24

FOREIGN PATENTS 860,530 2/1961 Great Britain.
860,741 2/1961 Great Britain.
930,496 7/1963 Great Britain.

OTHER REFERENCES

Bauer, German application 1,090,880, printed Oct. 13, 1960.

NORTON ANSHER, *Primary Examiner.*
WILLIAM MISIEK, *Examiner.*